US008023972B2

(12) United States Patent
Goyal et al.

(10) Patent No.: US 8,023,972 B2
(45) Date of Patent: Sep. 20, 2011

(54) MESSAGE AND ADDRESS BOOK INTERCHANGE VIA SHORT MESSAGE SERVICE

(75) Inventors: Vibhore Goyal, Jaipur (IN); Sean Blagsvedt, Bangalore (IN); Kentaro Toyama, Bangalore (IN); Joseph M. Joy, Bangalore (IN)

(73) Assignee: Microsoft Corporation, Redmond, WA (US)

( * ) Notice: Subject to any disclaimer, the term of this patent is extended or adjusted under 35 U.S.C. 154(b) by 1006 days.

(21) Appl. No.: 11/323,028

(22) Filed: Dec. 30, 2005

(65) Prior Publication Data
US 2007/0155409 A1 Jul. 5, 2007

(51) Int. Cl.
*H04W 4/00* (2009.01)
(52) U.S. Cl. ............. 455/466; 455/414.1; 455/414.2; 455/414.3; 455/414.4; 709/206
(58) Field of Classification Search .............. 455/466, 455/414.1, 414.2, 414.3, 414.4; 709/206
See application file for complete search history.

(56) References Cited

U.S. PATENT DOCUMENTS

| 6,813,507 | B1 * | 11/2004 | Gress et al. ............. 455/466 |
| 6,941,557 | B1 * | 9/2005 | Jakobson et al. ............. 719/316 |
| 7,117,247 | B2 * | 10/2006 | Hyakutake et al. ............. 709/206 |
| 7,146,404 | B2 * | 12/2006 | Kay et al. ............. 709/206 |
| 7,284,048 | B2 * | 10/2007 | Jakobson et al. ............. 709/224 |
| 2002/0112014 | A1 * | 8/2002 | Bennett et al. ............. 709/206 |
| 2003/0078032 | A1 * | 4/2003 | Pei et al. ............. 455/411 |
| 2004/0267586 | A1 * | 12/2004 | McDougal et al. ............. 705/8 |
| 2005/0197885 | A1 * | 9/2005 | Tam et al. ............. 705/10 |
| 2006/0015603 | A1 * | 1/2006 | Jakobson et al. ............. 709/223 |
| 2006/0199599 | A1 * | 9/2006 | Gupta et al. ............. 455/466 |

OTHER PUBLICATIONS

Barker, "Google Launches Beta of SMS Search Queries," Clickz Internet Advertising News, pp. 1-2, Oct. 7, 2004, from http://clickz.com/news/print.php/3418811.
*Now Available in over 22 cities*! Dodgeball.com :: mobile social software, pp. 1-2. Retrieved Mar. 29, 2006, from http://www.dodgeball.com.
*Meet friends of friends*! Dodgeball.com :: mobile social software, pp. 1-2. Retrieved Mar. 29, 2006, from http://www.dodgeball.com.
*Guide and Shout*. Dodgeball.com :: mobile social software, pp. 1-2. Retrieved Mar. 29, 2006, from http://www.dodgeball.com.
*Your Friends*. Dodgeball.com :: mobile social software, pp. 1-2. Retrieved Mar. 29, 2006, from http://www.dodgeball.com.

* cited by examiner

*Primary Examiner* — Rafael Pérez-Gutiérrez
*Assistant Examiner* — Liton Miah
(74) *Attorney, Agent, or Firm* — Klarquist Sparkman, LLP (57) ABSTRACT

Users can send short message service (SMS) communication with the purpose of the communication being implied therein. An SMS broker described herein can derive the implied purpose by parsing the communication at least in part according to defined set of rules of syntax and in light of a current context within which the communication was received. In one aspect, the communication is brokered via the SMS broker and it may be intended as a message to be sent to another user identified by a moniker, such as their e-mail alias, which has the advantage of avoiding the need to store phone numbers on memory-constrained devices. In another aspect, the communication is a request for user data of other users also identified in the request by a simple moniker such as their e-mail alias. Additionally, a user can also send a communication intended to update their own user information such as their current location, availability and so on.

12 Claims, 5 Drawing Sheets

MESSAGE AND ADDRESS BOOK INTERCHANGE VIA SHORT MESSAGE SERVICE

FIELD

The field relates to short message service (SMS) technology. More particularly, it relates to using networked directories to communicate by the way of SMS.

BACKGROUND

Short Message Service (SMS) messaging or SMSing, as it is more colloquially known, is fast becoming one of the most common ways that cellular phone users communicate with each other. SMS was first proposed in the fall of 1982 by a Finnish civil servant by the name of Matti Makkonen in a Copenhagen pizzeria during a conference of mobile phone communication technology. From such a humble beginning, the SMS has grown to begin to rival speech as the most common method of communication from a mobile device.

SMS based services are developing rapidly throughout the world. By mid-2004, text messages were being sent at a rate of 500 billion messages every year. At an average cost of 10 cents per SMS message, revenue generated from SMS messages amounts to an excess of 50 billion USD for cellular telephone operators. Moreover, the rate of growth has been rapid. For instance, in 2001, 250 billion short messages were sent, in comparison to year 2000 when just 17 billion messages were sent. SMS is particularly popular in Europe, Asia (excluding Japan and Korea), and Australia. The popularity of SMS is partly being driven by its cost advantage over speech on the cellular phone.

So far, however, the use of SMS is mostly prevalent in the consumer world and has been relatively disconnected from corporate messaging and directory solutions. However, corporate messaging services with their access to a vast directory of users can present a huge opportunity for efficient and timely interchange of information via SMS. Thus, there is a need for marrying SMS messaging to corporate messaging products, such as Microsoft® Exchange Server, thereby making the SMS messaging useful to a much larger group of users.

SUMMARY

Described herein are various methods and systems for processing SMS communications. In one aspect, such processing comprises determining an intended purpose of the SMS communication based at least in part on parsing the incoming SMS communication according to a defined set of rules of syntax. The intended purpose of the communication is implied in the message sent by a user. Implied purposes may include, but is not limited to, a search, such as a request for information from a directory service for a registered user who is identified in the message by an addressing moniker, the purpose may also be a request to send a message to another registered user and another example purpose may be a request to update user's own user-data stored in a directory service.

In another aspect, the addressing monikers are e-mail aliases and, thus, one user can send a message to another by merely specifying the e-mail alias instead of the intended recipient's phone number. In one further aspect, the rules of syntax comprises a rule that, if an incoming SMS communication is already part of an existing active communication session and the first unit of text in the SMS communication is not followed by any other text, then the first unit of text is interpreted to be an addressing moniker, such as an e-mail alias and the intended purpose of the SMS communication is determined to be a request for user-data of the registered user associated with the addressing moniker. In a further rule of syntax, if the addressing moniker is self-addressing, then any text in the SMS communication following the self-addressing moniker is processed as information to be used for updating the user-data of the user identified by the self-addressing moniker. In yet another rule of syntax, if an incoming SMS communication is related to an existing communication session, then the text of the SMS communication is processed as a message to be delivered to one or more of the other users related to the same communication session.

In another aspect, data related to active communication sessions are maintained. This includes time elapsed from the last communication in each active communication session brokered by an SMS broker. Thus, in one further aspect, active sessions are terminated if the elapsed time from the last communication is above a threshold amount. Thus, each session has a defined life time, which is adjustable.

In one other aspect, SMS communications are brokered by an SMS broker which is programmed to implement the intended purpose of each communication based at least in part on the syntax of the message itself and a context in which it is received. These and other objects, features, and advantages of the technology will become more apparent from the following detailed description, which proceeds with reference to the accompanying figures.

DETAILED DESCRIPTION

An Exemplary System for SMS-Based Communication

Corporate messaging solutions such as Microsoft® Exchange Server, Microsoft® Active Directory and Lotus Notes® provide invaluable corporate directories and email services. Traditionally, these have been separated from the transport layer and address schemes of mobile networks; thus, users of mobile communication devices cannot send an SMS message to a corporate group via corporate messaging application, such as Microsoft® Exchange Server from their mobile phone, nor can they easily access information via SMS from a corporate directory.

Figure 1:
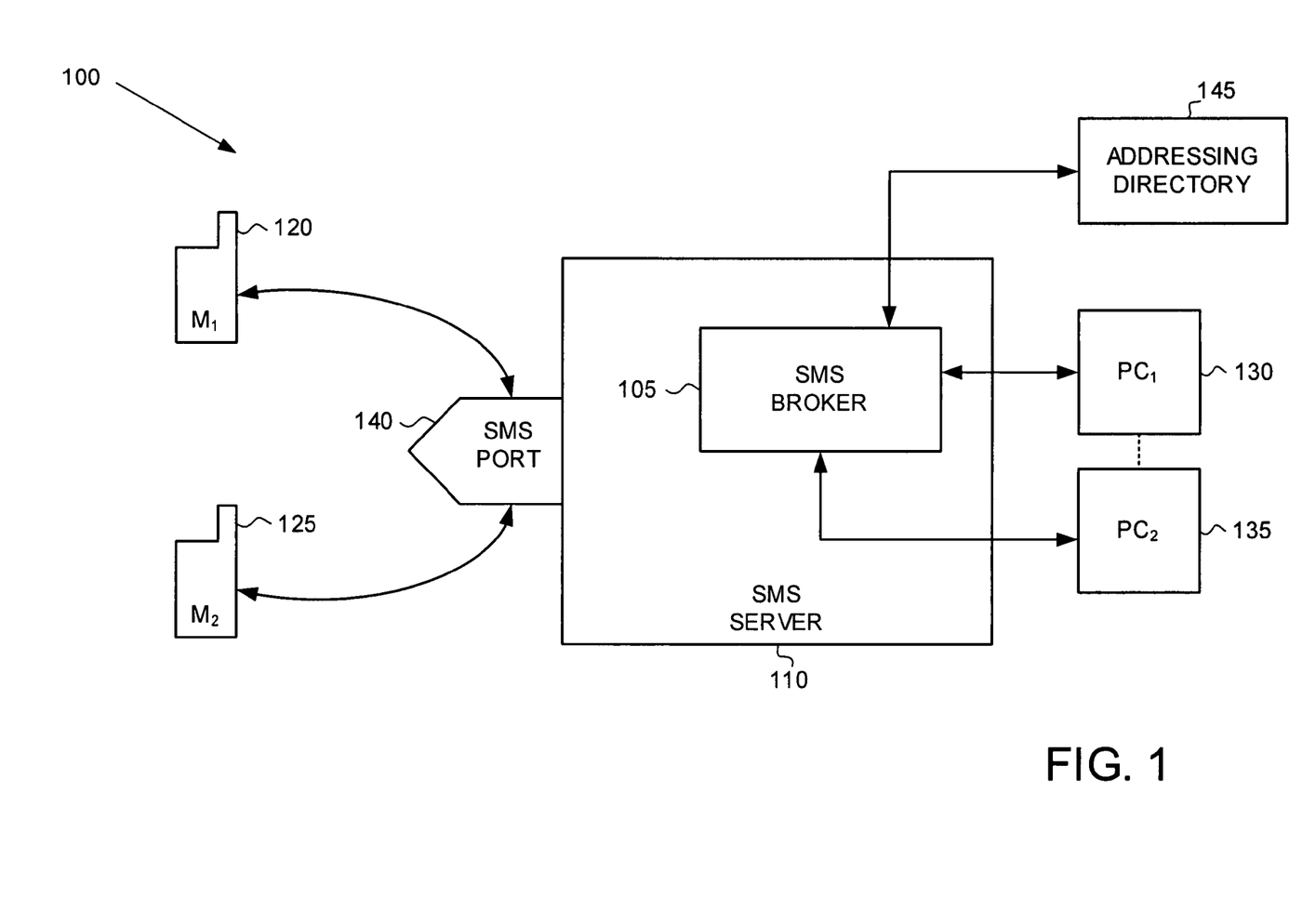
FIG. 1 is a block diagram of an exemplary system for brokering short message service communication.

FIG. 1 illustrates an exemplary system 100 for enabling exchange of information via SMS messages that is brokered, at least in part, by an SMS broker 105 running on an exemplary SMS server 110, which among other things, has the capability to access and use an addressing directory 145. Thus, for instance, a user of a first mobile communication device 120 can communicate with a user of a second mobile communication device user 125 via the SMS broker 105.

In one embodiment, communication is first addressed to the SMS broker 105. Thus, a user (e.g., of a mobile device 120) need not know the mobile phone number of those he or she wants to address (e.g., user of device 125). Instead, all they need to know is a moniker that uniquely identifies the SMS server 110 (e.g., a phone number or an alias associated with the subscriber identity module (SIM). Alternatively, the users need not address other users in the communication, but instead, they can request information from the SMS broker 105. Regardless, the SMS broker 105 parses the communication first and may access the directory 145 to appropriately direct the communication to the intended target.

As noted above, the SMS-based communication need not be limited to the mobile-to-mobile communication (e.g., between 120 and 125), and more particularly, it need not be limited to sending and receiving messages. In one embodiment, for instance, the communication relates to an SMS-based request or a search for personal information, such as an address, phone number, and/or whereabouts of another user of the system 100. Such information may be retrieved from a database such as the directory at 145. The result of such a request, in one embodiment, is an SMS-based reply that provides text related to the requested information. The reply containing personal information could also be in form of a vcard file (e.g., in .vcf file format of a Versitcard by the Versit Foundation). In another embodiment, the communication is between a user of a mobile device (e.g., 120) and tethered devices, such as Personal Computers (e.g., PC$_1$ at 130 and PC$_2$ at 135).

The communication with the SMS broker 105 is via an SMS enabled port 140 associated with the SMS server 110. There are numerous ways of implementing an SMS enabled port 140. One simple example involves adding a SIM card associated with a Radio Frequency (RF) transceiver to the SMS server 110. Another example involves, connecting an SMS enabled cellular mobile phone to the SMS server computer 110. Regardless, the SMS port 140 would be capable of sending and receiving SMS messages.

Exemplary SMS Communication Based on Defined Rules of Syntax and the Context of the Communication SMS messages are limited by the number of characters that comprise a message. In one current format, the limit is 160 characters. Although this limit might change over time, long winded SMS messages are undesirable, since the advantage of an SMS message is partly based on its brevity. This is no different when SMS-based communication is brokered by a server computer, such as the SMS server 110. Thus, in one embodiment, the SMS-based communication is made more efficient by using a defined set of syntax rules for enabling a user to provide or receive information while using a minimal number of characters. In addition to the defined syntax, much of the information from a message is gleaned not just from the characters of a message but also from the context of a message. The context includes information, such as, but not limited to, whether the communication was related to an active session, the origin of communication and string of previous communications in the same session.

Part of the information gleaned, based on the context and syntax includes an intended purpose of the communication. This is important, because the communication may be processed differently based on its intended purpose. For instance, as described above, the system 100 can process communication with different purposes, such as directing a message to an intended target, for requesting a certain type of information from a database, and for declaring some information regarding the user sending the communication. In each case, the SMS broker 105 processes the communication differently. However, the intended purpose of the communication is not declared explicitly within each communication. Instead, it is implicit and can be derived by interpreting the communication, in light of the defined set of rules of syntax and context associated with the communication. This is described in further detail below with reference to examples.

Figure 2:
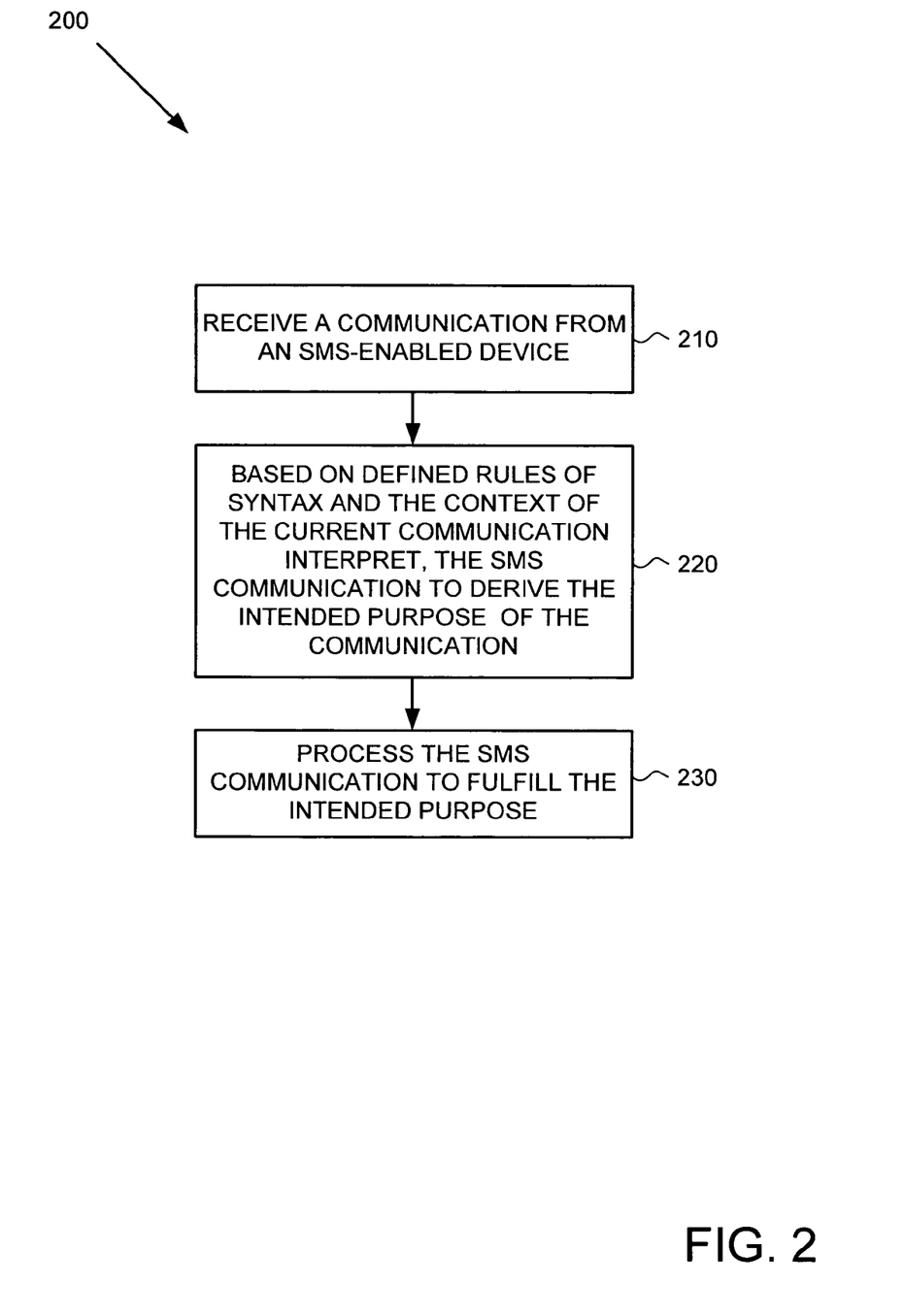
FIG. 2 is a flow chart describing an exemplary overall process for brokering short message service communication by processing the communication according to an intended purpose implied in the communication.

FIG. 2 describes an overall method 200 for interpreting an SMS communication based at least in part on a defined set of rules of syntax, and a context of the current communication. At 210 an SMS broker (e.g., 105 of FIG. 1) receives an SMS communication from a mobile device (e.g., 120 and 125 of FIG. 1). At 220, this communication is interpreted in light of a defined set of rules of syntax and a context of the communication to derive the intended purpose of the communication. Based on this derived purpose, at 230, the SMS broker processes the communication to fulfill the intended purpose.

Figure 3:
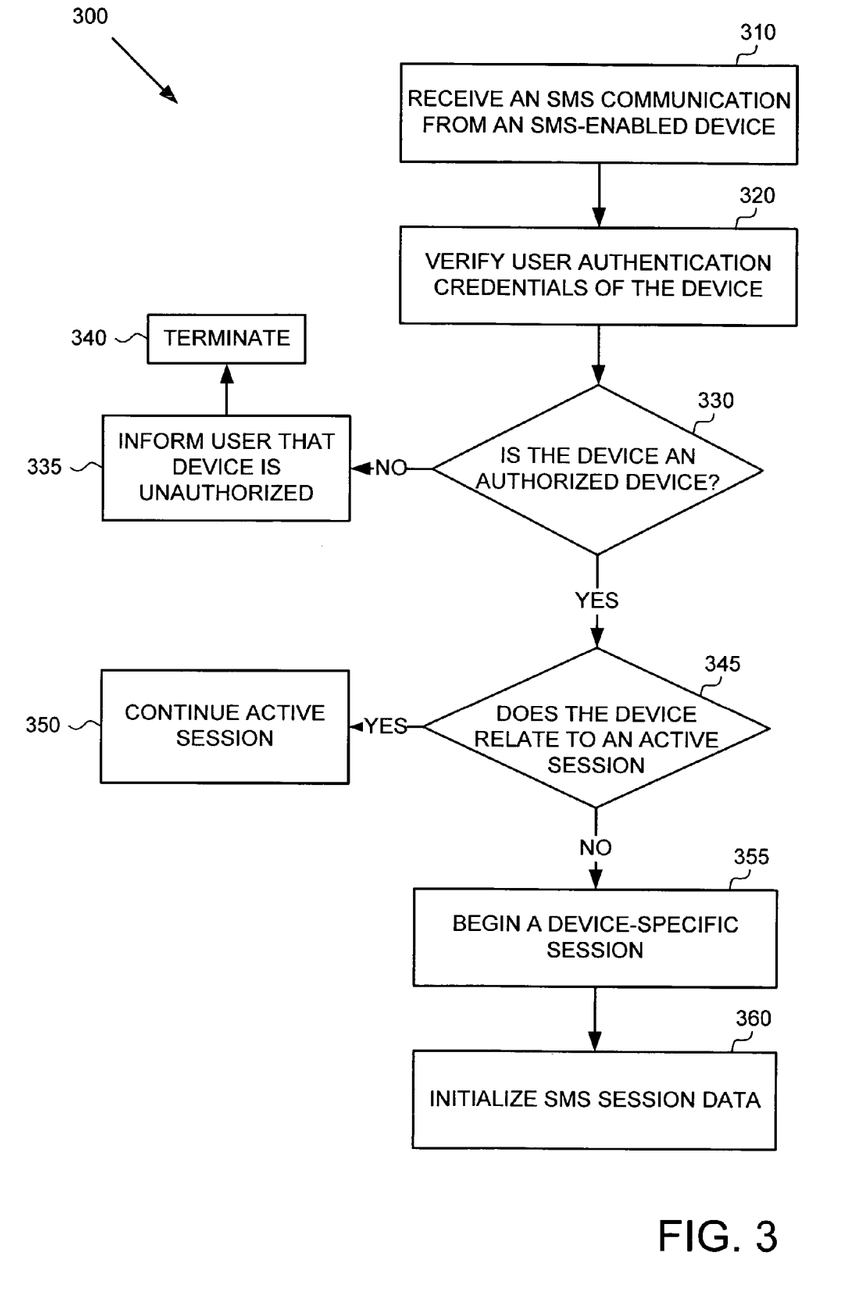
FIG. 3 is a flow chart describing an exemplary process for pre-processing of an incoming short message service communication including authenticating a device originating the communication and associating the device to a communication session.

Exemplary Initial Processing of an SMS Communication Including an Authentication of a User Device In one embodiment, prior to processing an SMS-based communication, the device originating the communication is authenticated for security purposes. FIG. 3 illustrates an exemplary method 300 of initial processing of an incoming SMS communication including an authentication of the mobile device (e.g., 120 and 125 of FIG. 1) originating the communication. Thus, for instance, once a communication is received, at 310 (e.g., via the SMS enabled port 140 of FIG. 1), the SMS broker (e.g., 105 of FIG. 1), at 320, reviews the credentials of the device and at 330, determines whether the device is associated with an authorized user. This determination can be based, for instance, on whether an identifier (e.g., SIM number) associated with the originating device is registered with a directory (e.g., 145 of FIG. 1) as an authorized user. Thus, if at 330, it is determined that the user is not an authorized user, and then at 335, the user is informed that the device is not an authorized device and the communication is terminated at 340. If, however, at 330, it is determined that the originating device is in fact an authorized device, then the processing proceeds to 345.

At 345, it is determined whether the device is associated with an active session that is underway. If at 345, it is determined that the originating device is in fact associated with an active session, then at 350, the active session is continued. However, if at 345, it is determined that the originating device is not in fact associated with an active session, then at 355, a session involving the originating device is initiated along with initializing session data, at 360. Maintaining the session, among other things, provides a communication context which is used to interpret SMS communications. For instance, as described in further detail below, text of an incoming message can be interpreted and even processed differently based on whether the communication is or is not associated with an active session. Interpretation of a communication and processing also depends on whether the communication is a reply following a request as opposed to a message being sent to a particular target for the first time. The session information maintained can include, but is not limited to, such information as a session identifier, identifiers associated with devices involved in a session, and a stack comprising content of communication exchanged so far in the session. Each individual mobile device (e.g., 120 and 125 of FIG. 1) can be involved in multiple different sessions at any one time.

Exemplary Processing of an SMS Communication Based on Determining its Intended Purpose As noted above, the SMS broker 105 of FIG. 1 acts as an electronic gateway and enables SMS-based communication using a simple syntax to interpret SMS communication it receives and then directs the communication to the correct address based on a directory (e.g., 145 of FIG. 1) to which it has access. Thus, using any SMS-enabled phone (e.g., 120 and 125 of FIG. 1) and a computer (e.g., SMS server at 110 of FIG. 1) with a SIM-enabled communication port (e.g., 140 of FIG. 1) capable of sending and receiving SMS messages, users can look up contact information of other users registered with an associated directory (e.g., 145 of FIG. 1), and send/receive SMS messages to any user or distribution list. These things can be accomplished, for instance, by using only a moniker, such as e-mail aliases. Thus, users do not need to know a phone number of another user to send an SMS. A user can also declare information regarding their own status, such as their availability, their location, and so forth by sending an SMS-based communication.

Figure 4:
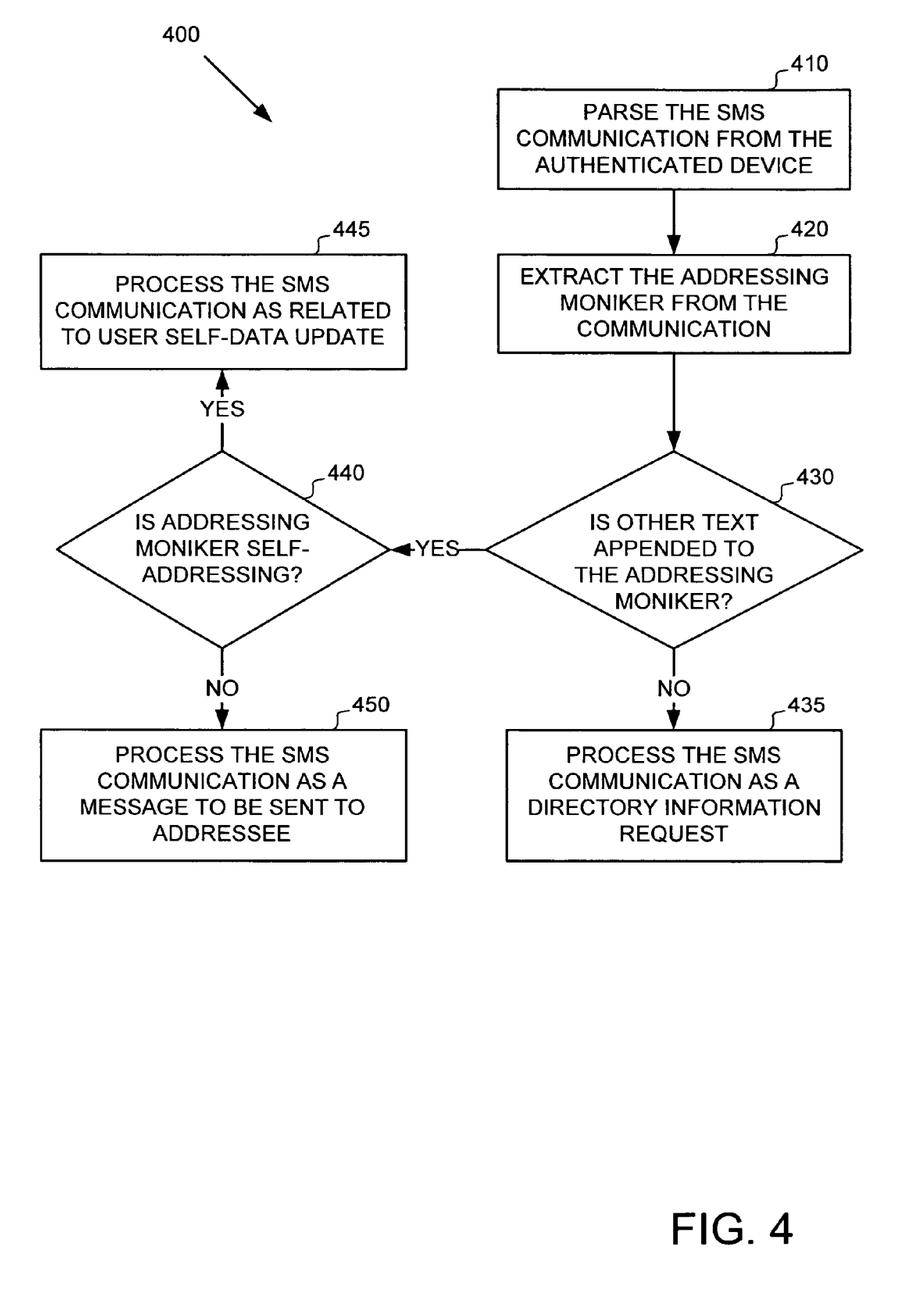
FIG. 4 is a flow chart describing exemplary processing of an incoming short message service communication being processed differently based on applying a defined set of rules of syntax to the content of the message.

FIG. 4 illustrates an exemplary method 400, wherein the SMS broker (e.g., 105 of FIG. 1) parses an incoming SMS communication to determine the intended purpose of the communication and to process the communication accordingly. At 410, the SMS broker 105 of FIG. 1 parses the incoming SMS communication. At 420, it extracts addressing monikers, if any, from the communication content. Then at 430, it determines whether other text is included in the communication along with the addressing moniker.

If at 430, it is determined that there is no other text other than the addressing moniker in the communication, then, at 435, the communication is processed as a request for information related to a user associated with the addressing moniker. For instance, if the communication comprises just an e-mail alias, then the SMS broker (e.g., 105 of FIG. 1) accesses an associated directory (e.g., 145 of FIG. 1) to retrieve information stored therein for a user associated with the e-mail alias. Such information may include, but is not limited to, the user's address, title, e-mail addresses, telephone numbers, and so on. The personal information can be presented to a requester in form of SMS text or in form of personal information stored in a standard file format such as, a vcard in a .vcf file format. In this manner, the requester can accept the vcard, for instance, and automatically update the directory on their own mobile device. The vcard in .vcf format is merely exemplary, other file formats for storing personal information and other digital identity information such as Light-Weight Identity (e.g., hcard) by Net Mesh and the XML-vcard by Jabber Foundation can also be used.

However, if at 430, it is determined that other text is included with the communication, then the processing proceeds to 440. At 440, the SMS broker (e.g., 105 of FIG. 1) determines whether the extracted address moniker is self-addressing. Self-addressing in this context is a determination of whether the addressing moniker in the communication is associated with the device originating the communication.

For instance, this would be true if the e-mail alias associated with an exemplary communication is associated with a registered user of the device on which the communication originated. If at 440 this is true, then at 445, the communication is processed as one related to updating self-data associated with the registered user of the device. For instance, a user might update their own availability (e.g., out of office, not available by e-mail communication, not reachable by phone, etc.) or their physical location data (e.g., in Paris sales office, in Bangalore development center, etc.).

If, however, at 440, it is determined that the communication is not self-addressed, then at 450, the communication is processed as a message to be sent to the addressing moniker extracted at 420. Thus, in this manner, based at least in part on a defined set of rules of syntax, the purpose of the communication implicitly expressed by the originator of the communication can be deciphered and the communication can be processed accordingly.

Examples of SMS Communication Syntax and Their Associated Processing

The exemplary syntax for conducting SMS communication is described here with reference to examples. In response to a user sending an SMS communication to an access number associated with an SMS server (e.g., 110 of FIG. 1), the SMS broker 105 of FIG. 1 determines that the incoming SMS communication is from a registered mobile device (e.g, 120 and 125 FIG. 1). If it is not, it sends back an error SMS message informing the user to update their mobile number in their corporate directory (e.g., 335 in FIG. 3). If it is determined that the device in question is an authorized device, the communication is parsed by the SMS broker 105 in the following manner:

<intended alias> <any other text>

In one exemplary rule of syntax, the first word (e.g., reading left to right) in the SMS communication, is assumed to be an e-mail alias, "<intended alias>" (e.g, billG). If the "<intended alias>" (e.g., billG) is not found in the directory (e.g., 145 in FIG. 1), then an SMS will be sent back to the sender, asking the sender to choose an option from a set of the best possible matches. For instance, the reply may list a possible set of options that match the first set of characters along with an identifier for each match option. This implies a request to choose one of the possible listed options. For instance, if a user just types in "bill", the generated list of options may be as follows:

1. Bill Adams 2. Bill Allchin 3. Bill Gibson 4. more . . . .

Thus, in this manner, the user can proceed with the communication, even if the user does not remember the exact e-mail alias of the intended target.

If the "<intended alias>" or the choice matches an existing e-mail alias and the SMS communication contains no other text, then the directory information stored in conjunction with the parsed e-mail alias is retrieved and presented to the user. For instance, if all that the communication contains is "billG", then the contact information for the employee or group that owns that alias is returned. In this case, the exemplary reply of "Bill Gibson, 123-456-7890, building A9998, online status: Online" is returned to the originator of the communication.

If <intended alias> matches an existing e-mail alias, the communication contains additional text after it, and the e-mail alias is not self-addressing (e.g., 440 and 445 in FIG. 4), then the parsed text coming after the e-mail alias is assumed to be a message to be delivered to the user matching the e-mail alias. The SMS broker (e.g., 105 of FIG. 1) then looks up the matched contact's mobile number and forwards the message appropriately, including the authenticated contact information of the sender. For example, if the exemplary communication is "billG where are you?", then one exemplary SMS message sent from the SMS server's (e.g., 110 of FIG. 1) number to Bill Gibson's mobile phone is as follows:

"Sean Blagsvedt at +919-222-2222 wrote: Where are you?

If the "<intended alias>" matches an existing distribution alias and contains additional text after it, the message is forwarded to the mobile numbers of all members of the distribution alias. For instance, if the communication is as follows:

"MSRIndia anyone want to go to a movie tonight?"

Then an SMS message to all members of "MSRIndia" group alias is sent using the mobile number specified for them in the directory (e.g., 145 of FIG. 1). One exemplary form of that message is as follows:

"Sean Blagsvedt at +919-222-2222 wrote: anyone want to go to a movie tonight?"

If <intended alias> matches the contact associated with the originating mobile SMS number, the SMS broker (e.g., 105 of FIG. 1) assumes that the user is updating his or her own status. Thus, if the communication is "seanB playing tennis" and, if the mobile device (e.g., 120 and 125 of FIG. 1) is registered as being associated with the user "seanB", then SMS broker (e.g., 105 of FIG. 1) assumes that "seanB" is trying to say something about the user. Accordingly, the SMS broker (e.g., 105 of FIG. 1) updates the directory 145 of FIG. 1 and status data 445 of FIG. 4 associated with "seanB" based on the text following the e-mail alias. In this case, seanB's current status is set as "playing tennis." In one embodiment, if another user requests information about seanB say, for instance, by typing in "seanB" then that other user is informed in a reply that "seanB playing tennis." The reply may contain other information related to "seanB", as well.

Exemplary Session Based SMS Communication

As noted above with respect to FIG. 3 above, for instance, session data is maintained, which in part helps the SMS broker (e.g., 105 of FIG. 1) interpret an incoming SMS communication in light of the defined rules of syntax. In one embodiment, the sessions are set to expire based on set criteria. For instance, one criteria for a session expiring may be inactivity for a given period of time (e.g., 15 minutes in one embodiment). Nevertheless, if an incoming communication is determined to be associated with an active session (e.g., one that has not expired), then the communication text is interpreted differently than if no active session is associated with an incoming communication.

For instance, if billG responds to seanB's "where are you?" message, by typing "I'm in Portland sales office", and the reply is determined to be related to an active session, then the reply by default will be sent back to the phone number associated with SMS server (e.g., 110) not to seanB's mobile number as is the default behavior of every mobile phone today. Thus, if the incoming communication is determined to be associated with an active session, it is assumed to be intended for the original sender identified in the session data. Thus, billG's response with the message, "I'm in Portland sales office" is forwarded back to the sender, seanB, rather than its beginning text ("at") being parsed as an e-mail alias.

After some set time period, however, the session between billG and seanB may expire and in that event, the exemplary incoming reply above from billG is no longer considered to be associated with an active session. In that case, the reply is parsed to interpret the first unit of text ("at") as an e-mail alias. A search for an e-mail alias "at" may be nonsensical. Thus, for some set period after a session has expired, incoming communication related to that session can be replied with an error message informing the sender that the session has expired and that they should initiate a new session.

Each user can be associated with multiple sessions. In that case, session data should be maintained for each of the sessions including individual timers for maintaining a time-out clock to measure the expiration of each session individually. Also, when one user is involved in multiple sessions, replies sent to the user from different sessions should be marked in a manner that identifies the session. Thus, for instance, if user A is communicating with user B in a session 1 and with a user C in a session 2, then replies from each of the sessions should be marked in a manner identifiable to user A. The case of one user's communication with a group of multiple users identified by one moniker is still considered to be a single session, since the session is identified as between two e-mail aliases, where one of the aliases happens to be a group alias. Thus, in this sense, the sessions are user-centric.

For each of the sessions, the SMS server (110 of FIG. 1) maintains session data that includes such information as address monikers involved in the session, a stack of previous communications in that session, time elapsed since the last communication in that session to determine expiration, a session identifier, etc. In an active session, there is some need of memory of the previous communication, because at least some of the communication is in the form of request and reply. For instance, in the case of presenting a list of potential communication partners to select from, the system remembers that a reply of a selection "3" designates a choice from a previously presented list, not text associated with an e-mail alias. This confusion can be avoided by determining that the communication is associated with an active session and by interpreting the communication in light of the active session including memory of the previous communications associated with the session.

Exemplary Computing Environment

Figure 5:
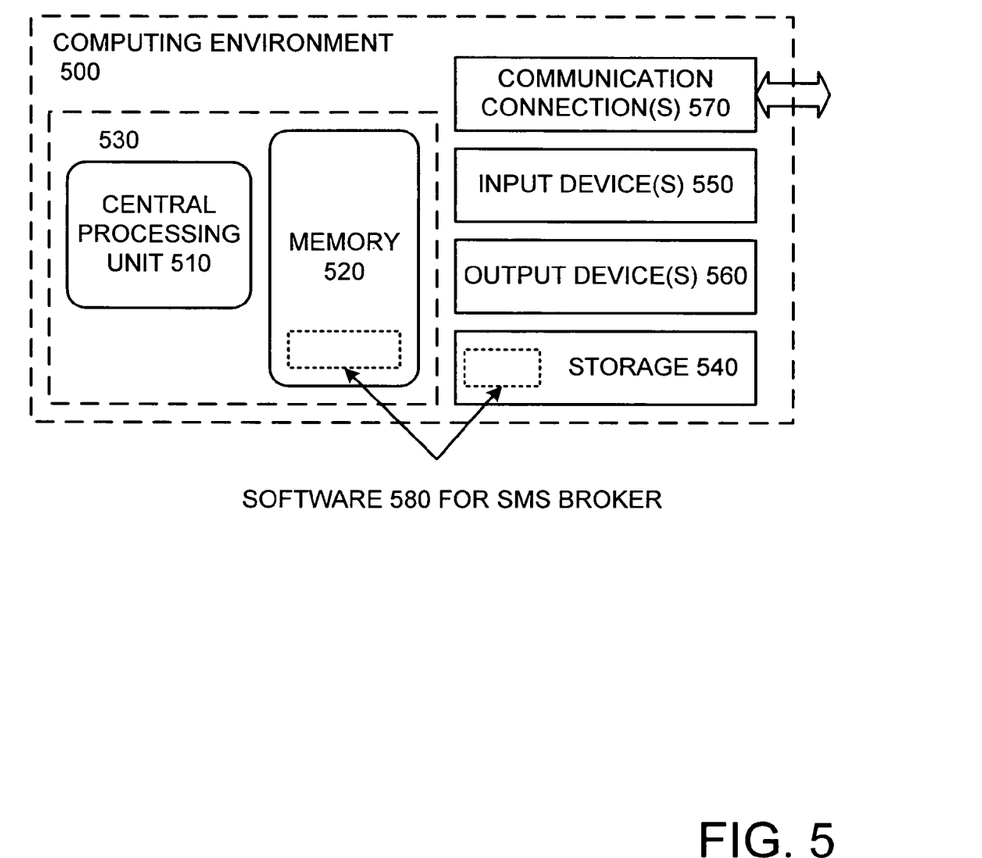
FIG. 5 is a block diagram illustrating an exemplary computing environment for implementing the methods of brokering SMS messaging as described herein.

FIG. 5 and the following discussion are intended to provide a brief, general description of an exemplary computing environment in which the disclosed technology may be implemented. Although not required, the disclosed technology was described in the general context of computer-executable instructions, such as program modules, being executed by a personal computer (PC). Generally, program modules include routines, programs, objects, components, data structures, etc., that perform particular tasks or implement particular abstract data types. Moreover, the disclosed technology may be implemented with other computer system configurations, including hand-held devices, multiprocessor systems, microprocessor-based or programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules may be located in both local and remote memory storage devices.

FIG. 5 illustrates a generalized example of a suitable computing environment (500) in which described embodiments may be implemented. The computing environment (500) is not intended to suggest any limitation as to scope of use or functionality of the technology, as the present technology may be implemented in diverse general-purpose or special-purpose computing environments.

With reference to FIG. 5, the computing environment (500) includes at least one central processing unit (510) and memory (520). In FIG. 5, this most basic configuration (530) is included within a dashed line. The central processing unit (510) executes computer-executable instructions and may be a real or a virtual processor. In a multi-processing system, multiple processing units execute computer-executable instructions to increase processing power and as such, multiple processors can be running simultaneously. The memory (520) may be volatile memory (e.g., registers, cache, RAM), non-volatile memory (e.g., ROM, EEPROM, flash memory, etc.), or some combination of the two. The memory (520) stores software (580) implementing the described methods of brokering SMS messaging as described herein. A computing environment may have additional features. For example, the computing environment (500) includes storage (540), one or more input devices (550), one or more output devices (560), and one or more communication connections (570). An interconnection mechanism (not shown) such as a bus, controller, or network interconnects the components of the computing environment (500). Typically, operating system software (not shown) provides an operating environment for other software executing in the computing environment (500), and coordinates activities of the components of the computing environment (500).

The storage (540) may be removable or non-removable, and includes magnetic disks, magnetic tapes or cassettes, CD-ROMs, CD-RWs, DVDs, or any other medium which can be used to store information and which can be accessed within the computing environment (500). The storage (540) stores instructions for the software (580) implementing methods of brokering SMS messaging as described herein.

The input device(s) (550) may be a touch input device, such as a keyboard, mouse, pen, or trackball, a voice input device, a scanning device, or another device, that provides input to the computing environment (500). For audio, the input device(s) (550) may be a sound card or similar device that accepts audio input in analog or digital form, or a CD-ROM reader that provides audio samples to the computing environment. The output device(s) (560) may be a display, printer, speaker, CD-writer, or another device that provides output from the computing environment (500).

The communication connection(s) (570) enable communication over a communication medium to another computing entity. The communication medium conveys information such as computer-executable instructions, compressed graphics information, or other data in a modulated data signal.

Computer-readable media are any available tangible media that can be accessed within a computing environment. By way of example, and not limitation, with the computing environment (500), computer-readable media include memory (520), storage (540), communication media, and combinations of any of the above.

Having described and illustrated the principles of our technology with reference to the illustrated embodiments, it will be recognized that the illustrated embodiments can be modified in arrangement and detail without departing from such principles. Elements of the illustrated embodiment shown in software may be implemented in hardware and vice versa. Also, the technologies from any example can be combined with the technologies described in any one or more of the other examples.

In view of the many possible embodiments to which the principles of the disclosed technology may be applied, it should be recognized that the illustrated embodiments are only preferred examples of the technology and should not be taken as limiting the scope of the technology. For instance, many of the examples are described herein with reference to Short Message Service (SMS). SMS itself appears in several standard formats, including, but not limited to, SMS Point-to Point (SMS-PP as described in GSM recommendation 3.4, for instance) and SMS Cell Broadcast (SMS-CB). However, those of ordinary skill in the art will recognize that the principles illustrated by the examples described herein can be implemented with respect to SMS text messages in different formats. Thus, the claims are not limited by the message formats.

Also, as those of ordinary skill in the art will recognize that many of the examples used here include messages in the English language used to illustrate the principles of this technology and, as such, the exemplary rules of syntax were described with respect to conventions of the English language, such as reading from left to right, but the general principles described herein can be applied to other languages with accommodations made for their respective conventions. For instance, reading from right to left (e.g., Arabic and Persian) or reading from top to down (e.g., Japanese).

The examples are merely illustrative. The scope of the technology is defined by the following claims. We, therefore, claim as our technology all that comes within the scope and spirit of these claims.

We claim:

1. A short message service enabled computer system for brokering a short message service communication, the system comprising:
　memory having stored there on an addressing directory comprising registered user information including addressing monikers corresponding to registered users and device identifiers of their respective short message service enabled devices, wherein the addressing monikers are e-mail aliases; and
　at least one processor implementing a short message service broker operable for brokering the short message service communication including:
　　upon receiving a short message service communication from a short message service enabled device, determining whether the device is a registered device;
　　upon determining that the device is the registered device, determining whether the device is associated with at least one currently active communication session, wherein the at least one currently active communication session comprises session data that associates a sender email alias with a recipient email alias;
　　parsing a first unit of text of the incoming short message service communication differently based at least in part on whether the device is associated with the at least one currently active communication session or not; and
　　processing the communication to broker the communication;
　　wherein the short message service broker is further operable for maintaining session data associated with the at least one currently active communication session including a time elapsed from a last one of the short message service communication correspondingly associated therewith, and wherein the session data further comprises a session identifier, an identifier associated with the registered device, and a stack comprising content of communication exchanged previously in the session; and
　　wherein the short message service broker is further operable for terminating the at least one currently active communication session if the time elapsed from the last one of the short message service communication correspondingly associated therewith is beyond threshold amount of time.

2. The system of claim 1 wherein, if the device is not associated with at least one currently active communication session, parsing the first unit of text of the incoming short message service communication differently based at least in part on whether the device is associated with at least one currently active communication session or not comprises extracting an addressing moniker from the first unit of text of the incoming short message service communication.

3. The system of claim 1 wherein the short message service broker is further operable for determining whether the extracted addressing moniker is self-addressing; and
if the extracted addressing moniker is not self addressing, then processing any text in the incoming short message service communication appended to the addressing moniker as a message to be delivered to one or more other devices associated with the currently active communication session.

4. The system of claim 1 wherein the short message service broker is further operable for determining whether the extracted addressing moniker is self-addressing; and
if the extracted addressing moniker is not self addressing and the received short message service communication does not comprise text other than the extracted addressing moniker, then performing the following steps:
retrieving from the addressing directory user information of the registered user associated with the addressing moniker; and
sending a reply short message service communication to the device originating the short message service communication, the reply including at least some of the user information of the registered user.

5. The system of claim 4 wherein the reply including at least some of the user information of the registered user comprises a vcard file.

6. The system of claim 1 wherein the short message service broker is further operable for determining whether the extracted addressing moniker is self-addressing; and
if the extracted addressing moniker is self addressing, then processing any text in the incoming short message service communication appended to the addressing moniker as information for updating user data of a user associated with the extracted self addressing moniker.

7. The system of claim 1 wherein the device is not associated with at least one currently active communication session and parsing the first unit of text of the incoming short message service communication differently based at least in part on whether the device is associated with at least one currently active communication session or not comprises processing text of the incoming short message service communication as a message to be delivered to one or more other devices associated with the currently active communication session.

8. The system of claim 1 wherein determining whether the device is the registered device comprises verifying that the device identifier associated therewith agrees with a device identifier stored in the addressing directory as associated with one of the registered users.

9. A non-transitory computer readable storage medium useful in connection with a computer which includes a processor and a memory, the non-transitory computer readable storage medium storing computer executable instructions for performing a method of conducting short message service communication, the method comprising:
receiving a short message service communication;
determining whether a device sending the short message service communication is an authorized device;
if the device sending the short message service communication is the authorized device then parsing the short message service communication according to a defined set of rules of syntax, wherein the defined set of rules of syntax comprises:
a first rule according to which a first unit of text in the parsed communication is interpreted to be an addressing moniker, wherein the addressing moniker is an e-mail alias; and
a second rule according to which the addressing moniker not followed, or preceded, by any other text in the communication, and wherein the addressing moniker is the only text in the communication, is interpreted to mean that the intended purpose of the communication is related to a user information request, and wherein processing the user information request comprises retrieving the user information related to the parsed addressing moniker;
determining whether the device sending the short message service communication is involved in at least one active communication session, wherein the at least one currently active communication session comprises session data that associates a sender email alias with a recipient email alias;
if the device sending the short message service communication is not involved in at least one active communication session, interpreting a first unit of the short message service communication as an addressing moniker, wherein the addressing moniker is an e-mail alias, and processing the short message service communication according to the defined set of rules of syntax; and
if the device sending the short message service communication is involved in at least one active communication session, interpreting all text of the short message service communication as a message to be delivered to at least one other device also involved in the at least one active communication session.

10. The non-transitory computer-readable storage medium of claim 9 wherein the method further comprises retrieving user information related to a registered user associated with the addressing moniker if the device sending the short message service communication is not involved in at least one active communication session and the short message service communication comprises no other text besides the addressing moniker.

11. A computer-implemented method of conducting short message service communication, the method comprising:
receiving a short message service communication;
determining whether a device sending the short message service communication is an authorized device;
if the device sending the short message service communication is the authorized device then parsing the short message service communication according to a defined set of rules of syntax, wherein the defined set of rules of syntax comprises:
a first rule according to which a first unit of text in the parsed communication is interpreted to be an addressing moniker, wherein the addressing moniker is an e-mail alias; and
a second rule according to which the addressing moniker not followed, or preceded, by any other text in the communication, and wherein the addressing moniker is the only text in the communication, is interpreted to mean that the intended purpose of the communication is related to a user information request, and wherein processing the user information request comprises retrieving the user information related to the parsed addressing moniker;

determining whether the device sending the short message service communication is involved in at least one active communication session, wherein the at least one active communication session comprises session data that associates a sender email alias with a recipient email alias;

if the device sending the short message service communication is not involved in at least one active communication session, interpreting a first unit of the short message service communication as an addressing moniker, wherein the addressing moniker is an e-mail alias, and processing the short message service communication according to the defined set of rules of syntax; and if the device sending the short message service communication is involved in at least one active communication session, interpreting all text of the short message service communication as a message to be delivered to at least one other device also involved in the at least one active communication session.

12. The method of claim 11 further comprising retrieving user information related to a registered user associated with the addressing moniker if the device sending the short message service communication is not involved in at least one active communication session and the short message service communication comprises no other text besides the addressing moniker.

* * * * *

UNITED STATES PATENT AND TRADEMARK OFFICE
CERTIFICATE OF CORRECTION

PATENT NO. : 8,023,972 B2  Page 1 of 1
APPLICATION NO. : 11/323028
DATED : September 20, 2011
INVENTOR(S) : Vibhore Goyal et al.

It is certified that error appears in the above-identified patent and that said Letters Patent is hereby corrected as shown below:

In column 12, line 23-24, in Claim 9, after "at least one" delete "currently".

Signed and Sealed this
Fifteenth Day of November, 2011

David J. Kappos
*Director of the United States Patent and Trademark Office*